(12) United States Patent
Charlton et al.

(10) Patent No.: US 11,238,660 B2
(45) Date of Patent: Feb. 1, 2022

(54) DYNAMIC AUGMENTED REALITY COMPONENTS

(71) Applicant: Snap Inc., Santa Monica, CA (US)

(72) Inventors: Ebony James Charlton, Los Angeles, CA (US); Patrick Mandia, Venice, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/948,268

(22) Filed: Sep. 10, 2020

(65) Prior Publication Data

US 2021/0390781 A1 Dec. 16, 2021

Related U.S. Application Data

(60) Provisional application No. 63/037,559, filed on Jun. 10, 2020.

(51) Int. Cl.
*G06T 19/00* (2011.01)
*H04L 12/58* (2006.01)
*G06N 20/00* (2019.01)
*H04L 29/06* (2006.01)

(52) U.S. Cl.
CPC .......... *G06T 19/006* (2013.01); *G06N 20/00* (2019.01); *H04L 51/046* (2013.01); *H04L 67/42* (2013.01); *G06T 2219/024* (2013.01)

(58) Field of Classification Search
None
See application file for complete search history.

(56) References Cited

U.S. PATENT DOCUMENTS

| | | |
|---|---|---|
| 10,572,215 B1 | 2/2020 | Cooper et al. |
| 2017/0289338 A1 | 10/2017 | Riva et al. |
| 2018/0225267 A1* | 8/2018 | Warner, Jr. ......... G06F 16/9566 |
| 2019/0104093 A1* | 4/2019 | Lim ..................... G06F 11/1471 |
| 2019/0179405 A1 | 6/2019 | Sun et al. |
| 2019/0329134 A1 | 10/2019 | Shriram et al. |
| 2020/0092537 A1 | 3/2020 | Sutter et al. |
| 2020/0245017 A1* | 7/2020 | Ganschow ......... H04N 21/8545 |

OTHER PUBLICATIONS

"International Application Serial No. PCT US2021 035630, International Search Report dated Sep. 7, 2021", 3 pgs.
"International Application Serial No. PCT US2021 035630, Written Opinion dated Sep. 7, 2021", 4 pgs.

* cited by examiner

*Primary Examiner* — Tapas Mazumder
(74) *Attorney, Agent, or Firm* — Schwegman Lundberg & Woessner, P.A.

(57) ABSTRACT

The technical problem of adding content originating from a third party app to an augmented reality component maintained by the messaging server system is addressed by configuring the augmented reality component to modify content captured by a camera according to values of one or more attributes and to permit delivery of said values, from a third party app to the messaging server system, in the payload of a deep link that references the ID of the augmented reality component. The content that originates from the third party app and is provided to an augmented reality component maintained by the messaging server system may be dynamic, in that it may change over time, such as, e.g., sports scores provided by a sports news channel app.

20 Claims, 6 Drawing Sheets

DYNAMIC AUGMENTED REALITY COMPONENTS

CLAIM OF PRIORITY

This application claims the benefit of priority to U.S. Provisional Application Ser. No. 63/037,559, filed on Jun. 10, 2020, which is incorporated herein by reference in its entirety.

TECHNICAL FIELD

The present disclosure relates generally to facilitating interactions between a messaging client and third-party resources.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, can be designed to run on a mobile device such as a phone, a tablet, or a watch, while having a backend service provided on a server computer system to perform operations that may require resources greater than is reasonable to perform at a client device (e.g., storing large amounts of data or performing computationally expensive processing). For example, a messaging client and the associated messaging server system may be configured to permit online users to share content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
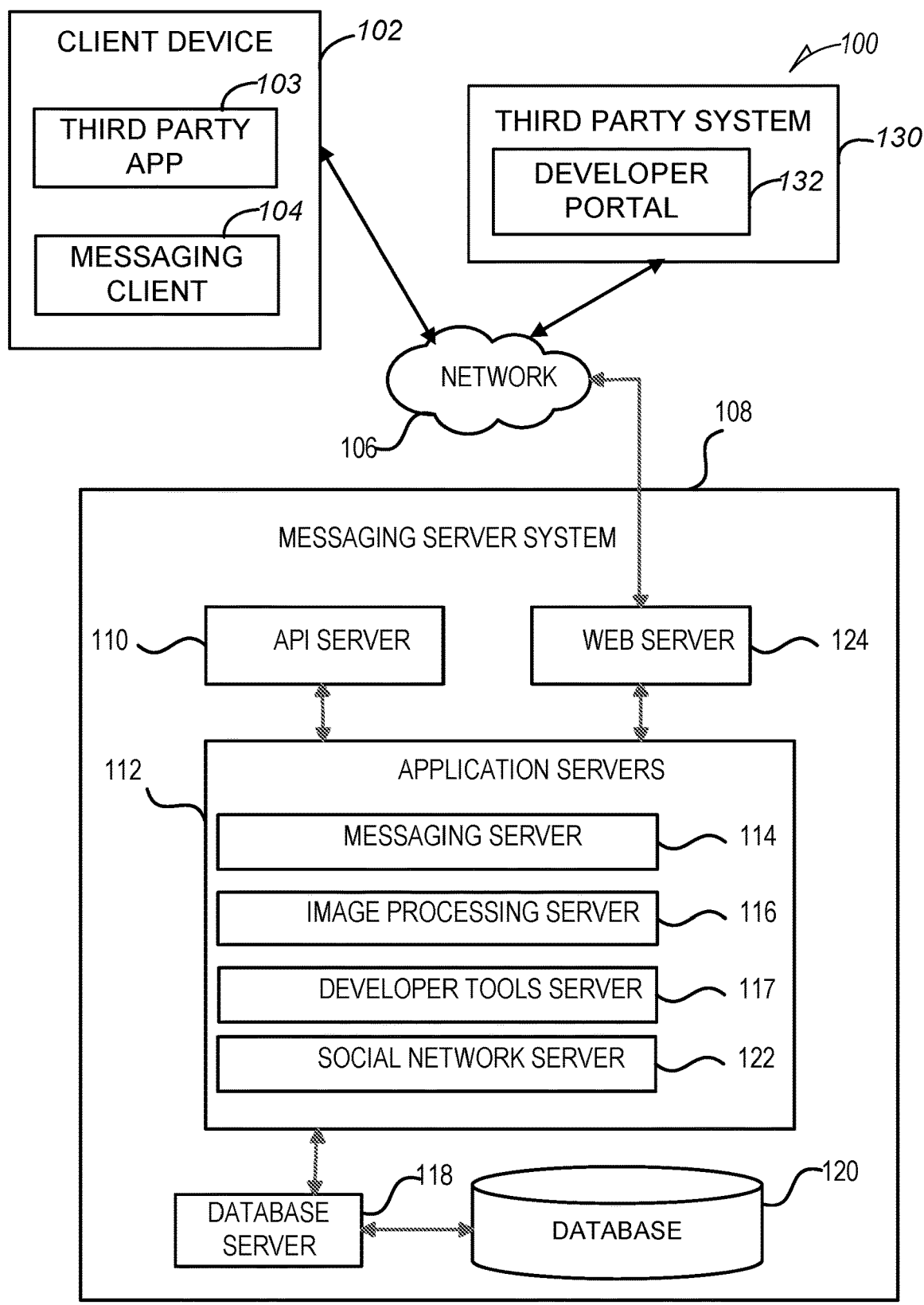
FIG. 1 is a diagrammatic representation of a networked environment in which a developer tools system may be deployed, in accordance with some examples.

A messaging server system, which hosts backend service for the associated messaging client, is configured to permit users to capture images and videos with a camera provided with a client device that hosts the messaging client and to share the captured content with other users via a network communication. The messaging server system is also configured to provide augmented reality (AR) components accessible via the messaging client that can be used to modify content captured by a camera, e.g., by overlaying pictures or animation on top of the captured image or video frame, as well as by adding three-dimensional (3D) effects, objects, characters, and transformations.

An AR component may be implemented using a programming language suitable for app development, such as, e.g., JavaScript or Java. An AR component can be executing within the messaging client while the camera is recording a video, such that each captured frame is modified in the way determined by the specific AR component configuration. For example, an AR component can be configured to detect, in each frame of a video, the head position of the person being captured in the video and overlay an image of a party hat over each frame above the detected head position, such that the viewer of the video captured with that AR component would see the person being captured in the video wearing a party hat. When the camera view screen is opened in the messaging client, the effect of an AR component can be applied to the captured image, and the messaging client may present a user with one or more visual controls that permit applying and removing the visual effect produced by the AR component, as well as selecting a desired AR component from a plurality of AR components.

A user can launch an AR component by opening the messaging client (which, in some embodiments, opens to a camera view screen ready to capture or already capturing an image or a video) and selecting an icon that represents the desired AR component. The AR components are identified in the messaging server system by respective AR component identifiers. In some embodiments, a particular AR component maintained by the messaging server system may be accessed directly from a third party resource, such as a third party app, without having to first launch the messaging client (either a stand-alone app or a web-based version of the app), via a deep link that references the AR component identifier. In the context of apps, deep linking may be described as using a uniform resource identifier (URI) that links to a specific location within an app rather than simply launching the app. When such deep link is activated from a third party app that is executing at a client device equipped with a camera, it is passed through to the messaging server system and back to the live camera of the client device, with the AR component referenced in the deep link by an AR component identifier activated. For the purposes of this description, activating an AR component in the messaging client results in making the AR component available for selection by a user. Launching an AR component results in application of the AR component effects to the captured content. Activating the live camera together with the operation of launching a given AR component results in applying the effect of the given AR component to the content being captured by the camera. In addition to providing access to AR components directly from third party apps, the messaging server system may be configured to permit third party developers to share the content that originates from their third party app to an AR component maintained by the messaging server system.

The technical problem of adding content originating from a third party app to an AR component maintained by the messaging server system is addressed by configuring an AR component to modify content captured by a camera according to values of one or more launch attributes and to permit delivery of said values, from a third party app to the messaging server system, in the payload of a deep link that references the AR component identifier of the AR component. The content that originates from their third party app to an AR component maintained by the messaging server system may be dynamic, in that it may change over time, such as, e.g., sports scores provided by a sports news channel app or current weather information provided by a weather app.

An AR component configured to modify content captured by a camera according to values of one or more launch attributes is termed a dynamic augmented reality component or a dynamic AR component, for the purposes of this description. A type of modification specified by a launch attribute may indicate that a certain type of content (e.g., text, image or animation) is to be overlaid over a portion of a captured image (e.g., centered over the lower right quadrant of the frame area). The value of such launch attribute may be, e.g., text, image, or animation. For example, the value of a launch attribute provided from a sports news channel app may be a string or an image indicating the running score of an ongoing sports event. For the purposes of this description, the value of a launch attribute that can be delivered to the messaging server system via a deep link may be referred to as simply an attribute. Another example of a launch attribute is one that references a binary asset (e.g., a three-dimensional machine learning model that takes, as input, content captured by a camera) that can be executed with respect to captured content resulting in replacing an entire object in a captured frame (e.g., a human body depicted in the frame) with a dimensional (3D) mesh or texture.

The messaging server system is configured to provide to users a set of developer tools that includes a feature that permits third party app developers to include, into their third party app, a deep link that references the AR component identifier and that can include, in the payload, values of one or more launch attributes. The developer tools provided by the messaging server system can be invoked from third party computer systems via a developer portal, which may be accessed, e.g., via a web browser. The developer portal can be downloaded to a third party computer system, in which case it may not require the use of a web browser. The developer portal can be used for obtaining a deep link that references a given AR component identifier, as well as to access an AR component service application programming interface (API) configured to permit third party developers to create new dynamic AR components. In some embodiments, the messaging server system pushes an AR component template and the attributes and assets that determine the functionality of the new AR component via the AR component service API, to the developer portal. The user interface (UI) provided with the developer portal permits a third party developer to select any attributes for the new AR component and to specify at least one attribute that would receive its value from the third party app via a deep link.

In operation, the third party app uses the developer tools provided by the messaging server system to construct a request to link to an AR component that has a particular AR component identifier. In some examples, the third party app is a registered client with respect to the developer tools provided by the messaging server system. The developer tools system is constructing the deep link and encrypting payload storing the AR component identifier and the attributes ready for launch.

When the messaging server system detects activation of a deep link from a client device (e.g., when a user activates a deep link using an associated visual control provided by a UI of a third party app), the messaging server system decrypts the deep link payload and obtains the AR component identifier, verifies that the AR component referenced by the AR component identifier in the deep link is valid and that the AR component is unlockable (meaning that it can be activated and made available for instant use in the messaging app). The attributes are then extracted from the payload of the deep link. The extracted attributes are stored at a persistent storage system, in a designated data object associated with the AR component identifier. The data object is configured, e.g., by a developer via the developer portal 132 using a scripting language, to be populated with attributes from the payload of the deep link when the associated AR component is initialized. The data object is used to surface the stored attributes to the AR component when the AR component is launched. The persistent storage system may be associated with the messaging server system or it may reside at the client computer system that hosts the messaging client.

Once the AR component is launched, the content captured from the camera view screen is augmented with modification provided by the AR component. In some embodiments, sending or posting captured content augmented with modification provided by the AR component causes the messaging client to have the AR component available to the user for a predetermined period of time, e.g., for 48 hours. The attributes extracted from the payload of the deep link and stored in the persistent storage system remain in the persistent storage system until the next invocation of the deep link from the third party app, at which time these stored attributes are overwritten by the new attributes, the ones extracted from the link at that time. In cases where an attribute extracted from a deep link is a reference to a binary asset, such attribute indicates the storage location of the referenced binary asset, which may be at the client computer devise that hosts the messaging client.

The methodologies described herein may be used beneficially with respect to various third party resources. A third party resource may be understood as installed apps, as well as an HTML-based minis and games. HTML is a markup language used for structuring and presenting content on the World Wide Web. Installed apps are software files that are installed on the device using executable code and that can be launched independently of the messaging client. Minis and games (that may be thought of as tiny apps that can be downloaded to a client device and that can run inside a larger app) are HTML-based apps that require the messaging client to download a markup language document and present it in the browser run by the messaging client (in a web view). The HTML files are retrieved for presenting the apps from the server when launched by a user.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and a third party app 103. The third party app 103 is configured to permit users to access functionality provided by a third party system 130. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120. A web server 124 is coupled to the application servers 112 and provides web-based interfaces to the application servers 112. To this end, the web server 124 processes incoming network requests over the Hypertext Transfer Protocol (HTTP) and several other related protocols. The database 120 stores data associated with messages processed by the application servers 112, such as, e.g., profile data about a particular entity. Where the entity is an individual, the profile data includes, for example, a user name, notification and privacy settings, as well as self-reported age of the user and records related to changes made by the user to their profile data.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The API server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server system 114, and for possible access by another messaging client 104, opening an application event (e.g., relating to the messaging client 104), as well as various functions supported by developer tools provided by the messaging server system 108 for use by third party computer systems.

The application servers 112 host a number of server applications and subsystems, including for example a messaging server system 114, an image processing server 116, and a social network server 122. The messaging server system 114 implements a number of message processing technologies and functions, particularly related to the aggregation and other processing of content (e.g., textual and multimedia content) included in messages received from multiple instances of the messaging client 104. The image processing server 116 that is dedicated to performing various image processing operations, typically with respect to images or video within the payload of a message sent from or received at the messaging server system 114. The social network server 122 supports various social networking functions and services and makes these functions and services available to the messaging server system 114.

Also shown in FIG. 1 is a developer tools server 117. The developer tools server 117 maintains one or more software developer kits (SDKs) that permit users to integrate some of the features provided with the messaging server system across their app (also referred to as third party app). These features include deep linking of a dynamic AR component configured to modify content captured by a camera according to values of one or more launch attributes delivered from a third party app to the messaging server system in the payload of a deep link that references the AR component identifier of the AR component. The functionality provided by the developer tools server 117 can be accessed from third party computer systems via a developer portal, which may be accessed via a web browser. A developer portal that provides third party computer systems (e.g., the third party system 130) with access to the functionality provided by the developer tools server 117, in some examples, can be downloaded to a third party computer system, in which case it may not require the use of a web browser. The third party system 130 is shown to include a developer portal 132. As explained above, the developer portal 132, can be accessed via a web browser executing on the third party app provider system 130 or downloaded to the third party computer system 130.

Figure 2:
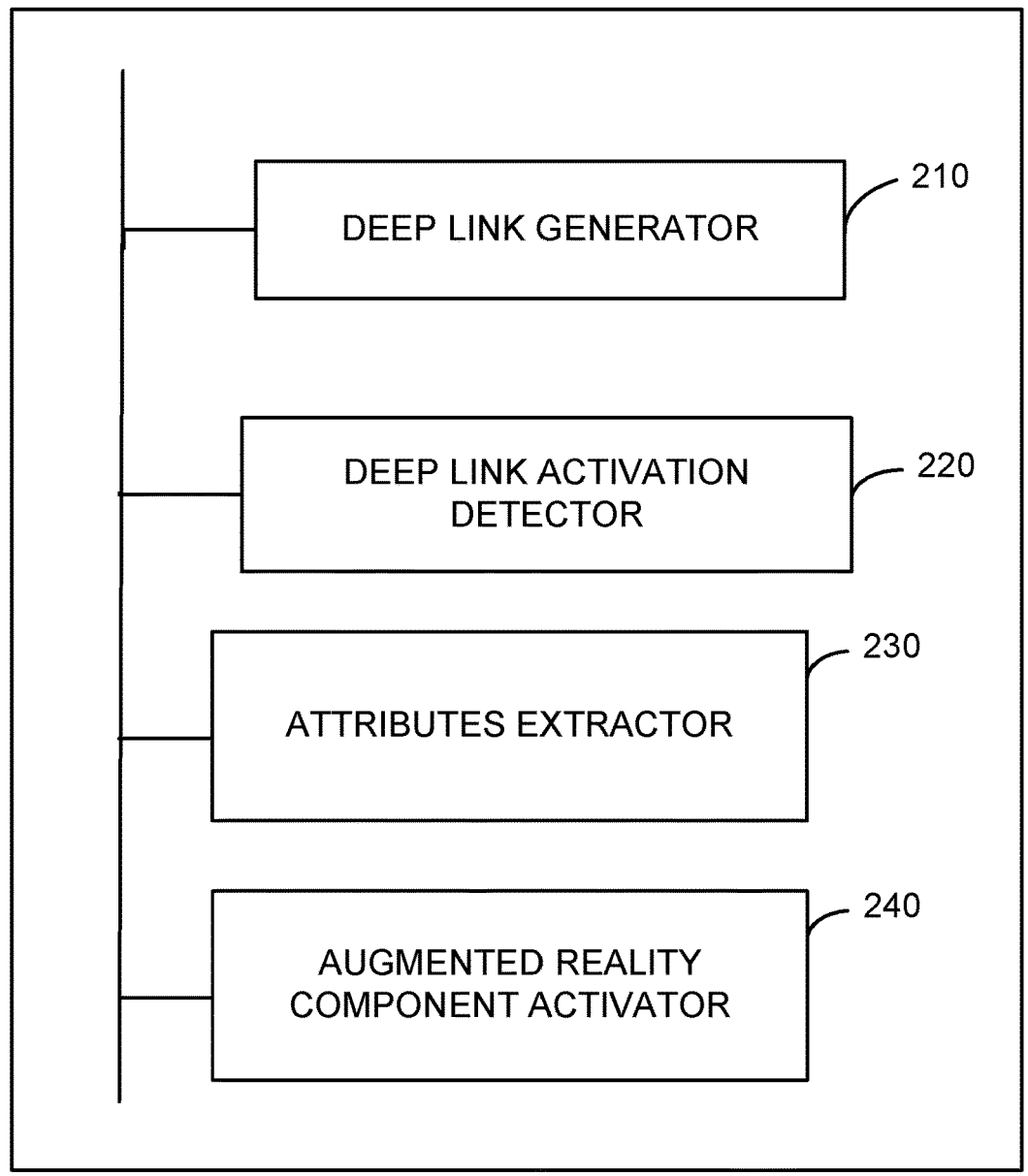
FIG. 2 is a block diagram of an architecture of a system for providing dynamic augmented reality components, in accordance with some examples.

FIG. 2 is a block diagram illustrating an example system 200 for providing dynamic AR components. The system 200 includes a deep link generator 210, a deep link activation detector 220, an attributes extractor 230, and an augmented reality component activator 240. As mentioned above, an augmented reality component may be referred to as AR component for the purposes of this description. The deep link generator 210 is configured to construct a deep link that includes a payload for storing an identifier (an augmented reality component identifier) representing an AR component in the messaging server system 108 of FIG. 1 and for storing values of the one or more launch attributes. As explained above, the AR component is configured to modify content captured by a camera according to values of the one or more launch attributes. The deep link activation detector 220 is configured to detect activation of the deep link from a third party resource executing at the client device (e.g., from the third party app 103 executing at the client device 102 of FIG. 1). The attributes extractor 230 is configured to extract, from the payload of the deep link, respective values of the one or more launch attributes and to store the extracted respective values in a persistent storage system.

The augmented reality component activator 240 is configured to cause launching of the messaging client 104 to a camera view screen. The camera view screen indicates that the camera is activated. The augmented reality component activator 240 uses the respective values to configure the AR component dynamically, as the respective values become available or are updated in the persistent storage system. The AR component, after it has been dynamically configured, is ready to be used to modify content captured by according to the stored respective values. The augmented reality component activator 240 then loads the dynamically configured AR component in the messaging client. Each of the various components of the system 200 may be provided at the client device 102 and/or at the messaging server system 108 of FIG. 1. Further details regarding the operation of the system 200 are described below.

Figure 3:
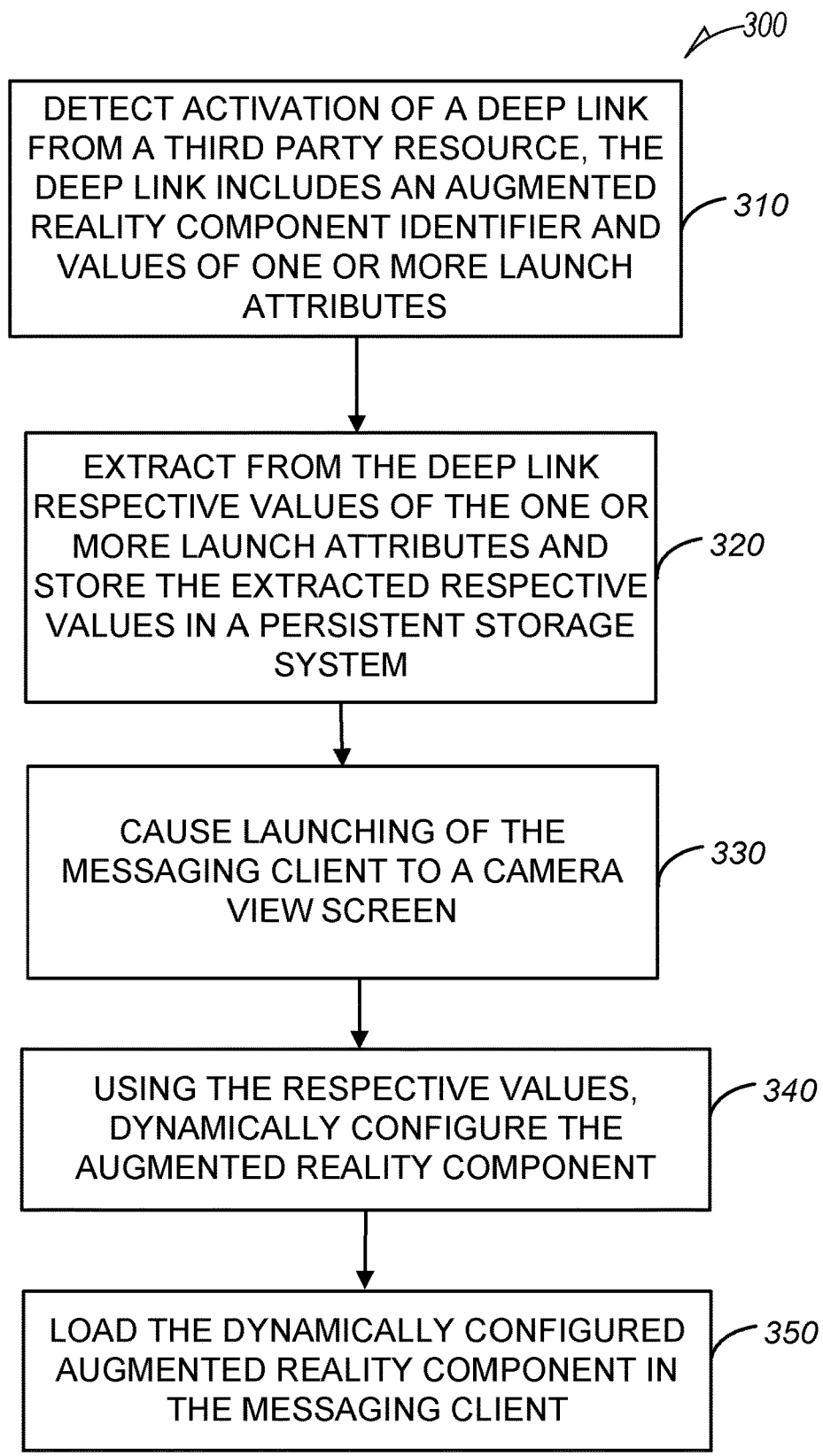
FIG. 3 is a flowchart of a method for providing dynamic augmented reality components, in accordance with some examples.

FIG. 3 is a flowchart of a method 300 for providing dynamic AR components. The method 300 may be performed by processing logic that may comprise hardware (e.g., dedicated logic, programmable logic, microcode, etc.), software, or a combination of both. In one example embodiment, some or all of the processing logic resides at the client device 102 of FIG. 1 and/or at the messaging server system 108 of FIG. 1. At operation 310, the messaging server system 108 detects activation of a deep link from a third party resource executing at the client device (e.g., from the third party app 103 executing at the client device 102 of FIG. 1). The deep link is constructed to include, in its payload, an AR component identifier representing an AR component in the messaging server system 108 and values of the one or more launch attributes. At operation 320, the values of the one or more launch attributes are extracted and stored in a persistent storage system. As mentioned above, the persistent storage system may reside at the client device 103 or at the messaging server system 108. At operation 330, the messaging client 104 is launched to a camera view screen. At operation 340, the respective values are retrieved from the persistent storage system and used to configure the AR component such that it can be used to modify content captured by the camera according to the stored respective values. At operation 350, the configured AR component is loaded in the messaging client.

Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
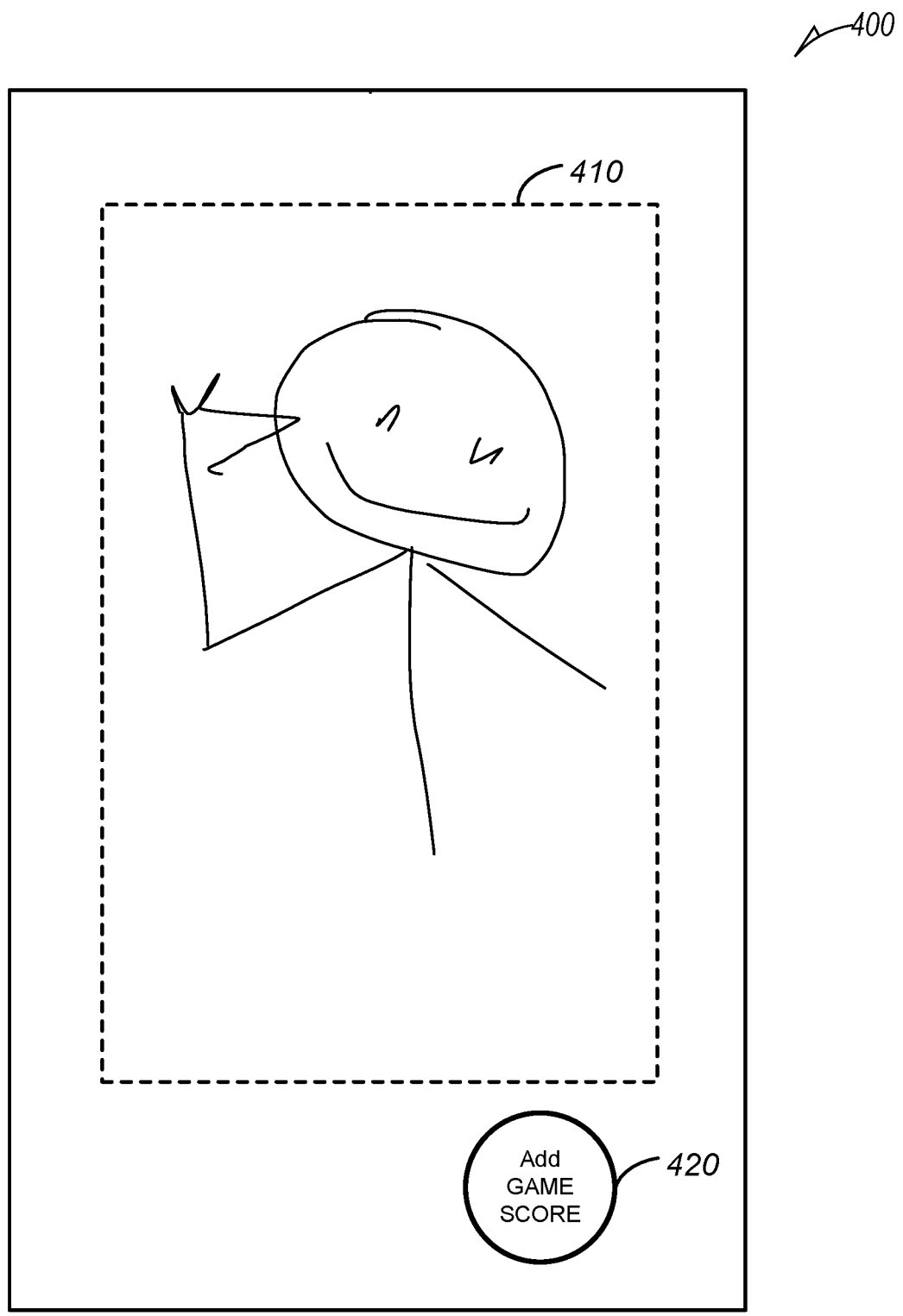
FIG. 4 is a diagrammatic representation of example content captured from a camera view screen of a messaging client.
Figure 5:
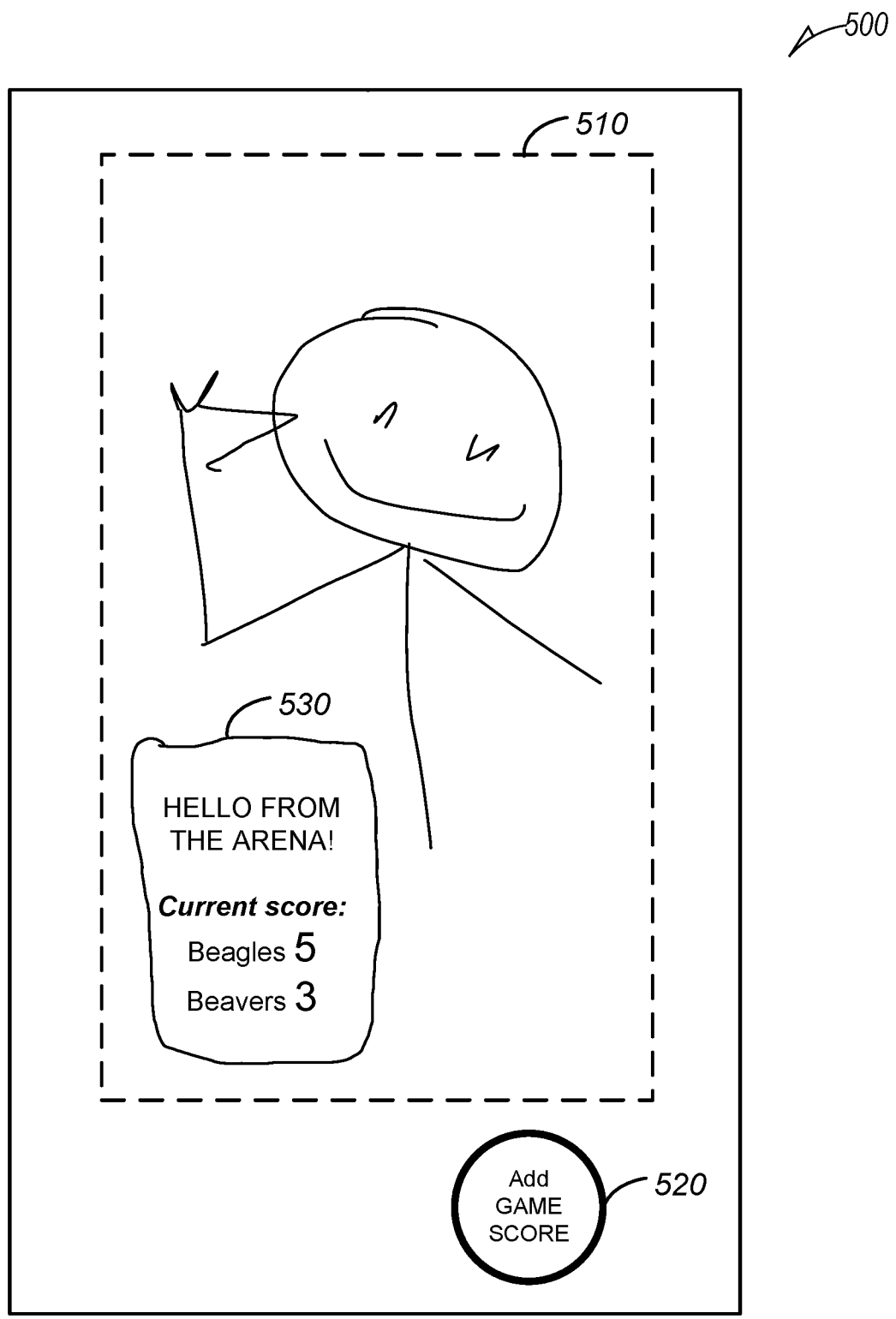
FIG. 5 is a diagrammatic representation of example content captured from a camera view screen of a messaging client, as modified using a dynamic augmented reality component, in accordance with some examples.

FIG. 4 is a diagrammatic representation 400 of example content captured from a camera view screen of the messaging client 104. Shown in area 410, is a person captured in a still image or in a frame of a video. A visual control 420 can be activated to apply modification of the associated AR component to the captured content. In this example, the visual control 420 is actionable to augment the captured content with the current sports game scores obtained from the third party app 103, from which the messaging client 104 was launched via a deep link. FIG. 5 is a diagrammatic representation 500 of content captured from a camera view screen of a messaging client, as modified using the AR component referenced in the deep link and according the values extracted from the payload of the deep link (in this example, the current sports game scores). Shown in area 510, is a person captured in a still image or in a frame of a video and, also, the current sports game scores shown in area 530, as overlaid over the captured content. A visual control 520 is shown using a thicker black line to indicate that the associated AR component has been launched. The deep link is constructed within the developer portal 132 executing at the third party system 130 of FIG. 1. The process of constructing the deep link includes additional variables to the payload of the deep link. Example attributes included in the payload of the deep link that results in the current sports game scores shown in area 530 of FIG. 5—variables team_one_score, team_two_score, team_one_name, team_two_name and their associated values—is shown below as Example 1.

Example 1 team_one_score: 5, team_two_score: 3, team_one_name: "Beagles", team_two_name: "Beavers"

The attributes shown in the Example 1 are stored in the data object associated with the AR component identifier referenced in the deep link. These attributes are passed directly into the AR component, from the data object, when the AR component is loaded in the messaging client 104. In one embodiment, using the example illustrated in FIG. 5, the AR component may be configured to modify binary assets within the AR component. For example, the AR component may be configured to highlight the team names and the scores using team colors and also to show the associated team logos. The team colors and the logo images could be predefined in the AR component and selected based on the attributed provided in the deep link payload.

Machine Architecture

Figure 6:
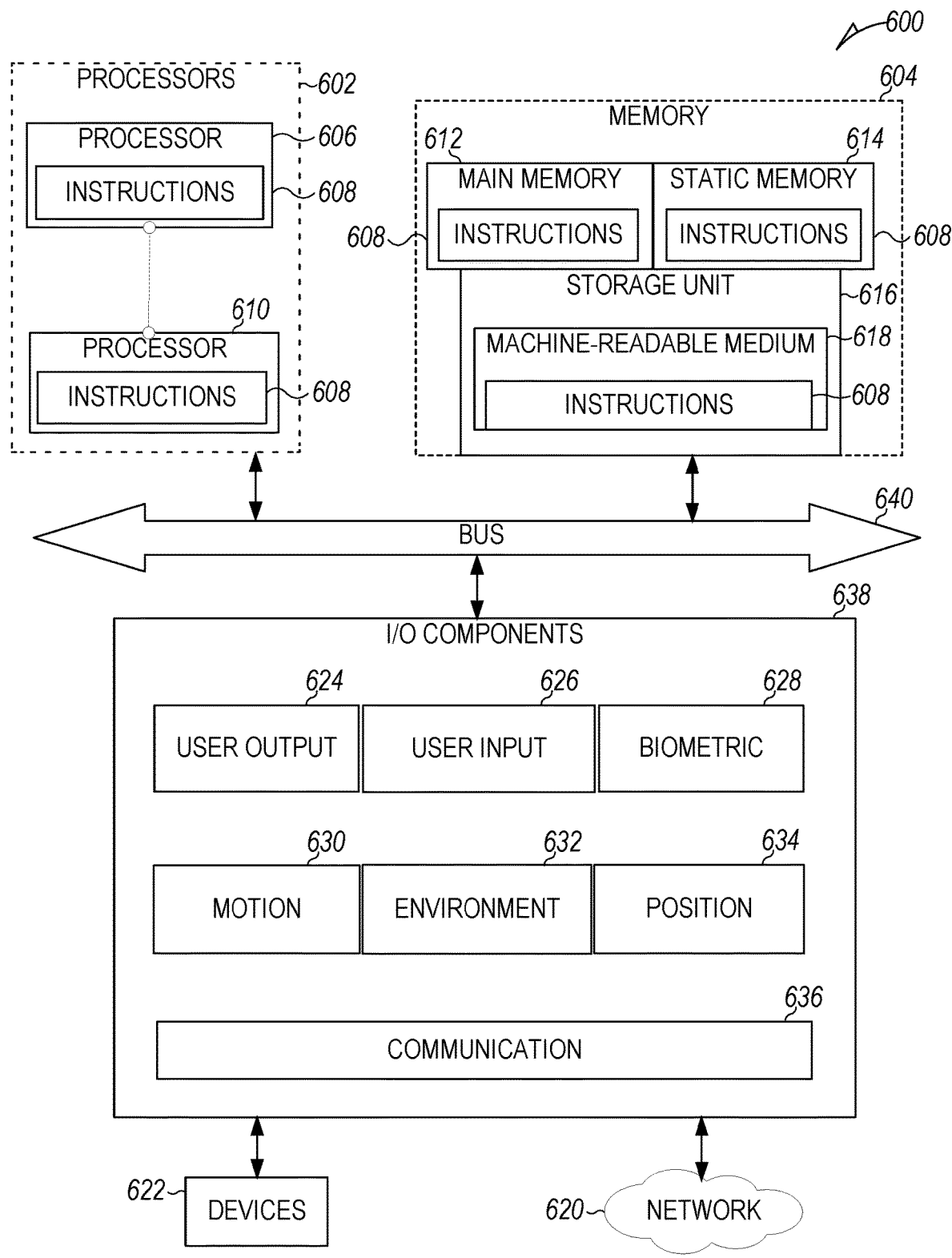
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 602, memory 604, and input/output I/O components 638, which may be configured to communicate with each other via a bus 640. In an example, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single-core, a single processor with multiple cores (e.g., a multi-core processor), multiple processors with a single core, multiple processors with multiples cores, or any combination thereof.

The memory 604 includes a main memory 612, a static memory 614, and a storage unit 616, both accessible to the processors 602 via the bus 640. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the Processor's cache memory), or any suitable combination thereof, during execution thereof by the machine 600.

The I/O components 638 may include a wide variety of components to receive input, provide output, produce output, transmit information, exchange information, capture measurements, and so on. The specific I/O components 638 that are included in a particular machine will depend on the type of machine. For example, portable machines such as mobile phones may include a touch input device or other such input mechanisms, while a headless server machine will likely not include such a touch input device. It will be appreciated that the I/O components 638 may include many other components that are not shown in FIG. 6. In various examples, the I/O components 638 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 638 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 3600 photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 638 further include communication components 636 operable to couple the machine 600 to a network 620 or devices 622 via respective coupling or connections. For example, the communication components 636 may include a network interface Component or another suitable device to interface with the network 620. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 612, static memory 614, and memory of the processors 602) and storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples.

The instructions 608 may be transmitted or received over the network 620, using a transmission medium, via a network interface device (e.g., a network interface component included in the communication components 636) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 622.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method comprising:
  at a backend server that provides a messaging client implemented by one or more processors of a client device, maintaining an augmented reality component identified by an augmented reality component identifier, the augmented reality component configured to modify, according to values of one or more launch attributes, content captured by a camera provided at the client device;
  at the backend server, providing a deep link, the deep link including a payload for storing the augmented reality component identifier and values of the one or more launch attributes; and
  at the backend server, in response to detecting activation of the deep link from a third party resource executing at the client device:
    extracting from the payload of the deep link respective values of the one or more launch attributes and storing the extracted respective values, causing launching of the messaging client to a camera view screen, the camera view screen indicating the camera being activated, using the respective values, dynamically configuring the augmented reality component to modify content captured by the camera by applying a modification according to the respective values of the one or more launch attributes, and loading the dynamically configured augmented reality component in the messaging client.

2. The method of claim 1, wherein the storing of the extracted respective values comprises persisting the extracted respective values at a persistent storage system until activation of a further instance of the deep link from the third party resource executing at the client device.

3. The method of claim 1, wherein:
a value of an attribute from the one or more launch attributes is an alphanumeric string; and
the modification is to overlay the alphanumeric string over a specified area of the content captured by the camera.

4. The method of claim 1, wherein a value of an attribute from the one or more launch attributes is a reference to a binary asset.

5. The method of claim 4, wherein the binary asset indicates a persistent storage location, the method comprising storing the binary asset at the persistent storage location at the client device.

6. The method of claim 4, wherein the binary asset is a three-dimensional machine learning model.

7. The method of claim 6, wherein the applying of the modification comprises executing the three-dimensional machine learning model using, as input to the three-dimensional machine learning model, the content captured by the camera.

8. The method of claim 1, further comprising activating an augmented reality component represented by the augmented reality component ID, the activating causing applying, to content captured by the camera, the modification identified by the respective values of the one or more launch attributes.

9. The method of claim 1, further comprising:
in response to detecting activation of a further instance of the deep link from the third party resource executing at the client device, the payload of the further instance of the deep link including new values:
overwriting the stored respective values with the new values, and
dynamically configuring the augmented reality component using the new values.

10. The method of claim 1, further comprising:
detecting a request from the messaging client to communicate, to a further computing device, content captured by the camera and modified by the dynamically configured augmented reality component; and
communicating, to the further computing device, the content captured by the camera and modified by the dynamically configured augmented reality component.

11. A system comprising:
one or more processors; and
a non-transitory computer readable storage medium comprising instructions that when executed by the one or processors cause the one or more processors to perform operations comprising:
at a backend server that provides a messaging client implemented by one or more processors of a client device, maintaining an augmented reality component identified by an augmented reality component identifier, the augmented reality component configured to modify, according to values of one or more launch attributes, content captured by a camera provided at a client device, the client device hosting a messaging client;

at the backend server, providing a deep link, the deep link including a payload for storing the augmented reality component identifier and values of the one or more launch attributes; and at the backend server, in response to detecting activation of the deep link from a third party resource executing at the client device:
extracting from the payload of the deep link respective values of the one or more launch attributes and storing the extracted respective values,
causing launching of the messaging client to a camera view screen, the camera view screen indicating the camera being activated,
using the respective values, dynamically configuring the augmented reality component to modify content captured by the camera by applying a modification according to the respective values of the one or more launch attributes, and
loading the dynamically configured augmented reality component in the messaging client.

12. The computing apparatus of claim 11, wherein the storing of the extracted respective values comprises persisting the extracted respective values at a persistent storage system until activation of a further instance of the deep link from the third party resource executing at the client device.

13. The computing apparatus of claim 11, wherein:
a value of an attribute from the one or more launch attributes is an alphanumeric string; and
the modification is to overlay the alphanumeric string over a specified area of the content captured by the camera.

14. The computing apparatus of claim 11, wherein a value of an attribute from the one or more launch attributes is a reference to a binary asset.

15. The computing apparatus of claim 14, wherein the binary asset indicates a persistent storage location, the method comprising storing the binary asset at the persistent storage location at the client device.

16. The computing apparatus of claim 14, wherein the binary asset is a three-dimensional machine learning model.

17. The computing apparatus of claim 16, wherein the applying of the modification comprises executing the three-dimensional machine learning model using, as input to the three-dimensional machine learning model, the content captured by the camera.

18. The computing apparatus of claim 11, the operations further comprising activating an augmented reality component represented by the augmented reality component ID, the activating causing applying, to content captured by the camera, the modification identified by the respective values of the one or more launch attributes.

19. The computing apparatus of claim 11, the operations further comprising:
in response to detecting activation of a further instance of the deep link from the third party resource executing at the client device, the payload of the further instance of the deep link including new values:
overwriting the stored respective values with the new values, and
dynamically configuring the augmented reality component using the new values.

20. A machine-readable non-transitory storage medium having instruction data executable by a machine to cause the machine to perform operations comprising:
- at a backend server that provides a messaging client implemented by one or more processors of a client device, maintaining an augmented reality component identified by an augmented reality component identifier, the augmented reality component configured to modify, according to values of one or more launch attributes, content captured by a camera provided at the client device;
- at the backend server, providing a deep link, the deep link including a payload for storing the augmented reality component identifier and values of the one or more launch attributes; and
- at the backend server, in response to detecting activation of the deep link from a third party resource executing at the client device:
    - extracting from the payload of the deep link respective values of the one or more launch attributes and storing the extracted respective values,
    - causing launching of the messaging client to a camera view screen, the camera view screen indicating the camera being activated,
    - using the respective values, dynamically configuring the augmented reality component to modify content captured by the camera by applying a modification according to the respective values of the one or more launch attributes, and
    - loading the dynamically configured augmented reality component in the messaging client.

* * * * *

UNITED STATES PATENT AND TRADEMARK OFFICE
CERTIFICATE OF CORRECTION

PATENT NO. : 11,238,660 B2  
APPLICATION NO. : 16/948268  
DATED : February 1, 2022  
INVENTOR(S) : Charlton et al.

It is certified that error appears in the above-identified patent and that said Letters Patent is hereby corrected as shown below:

In the Claims

In Column 15, Line 61, in Claim 11, after "or", insert --more--

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*